(No Model.)
E. S. VAN ZILE.
BULLETIN BOARD AND BASE BALL INDICATOR.
No. 402,700. Patented May 7, 1889.
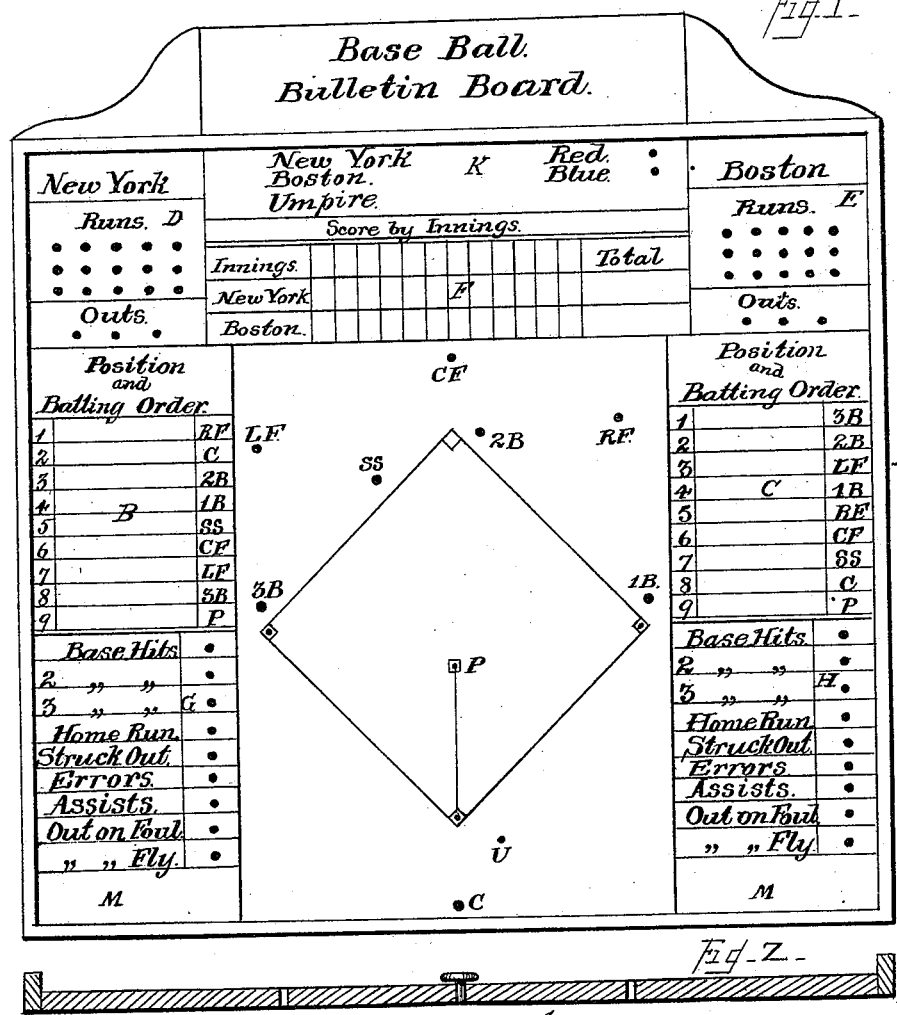
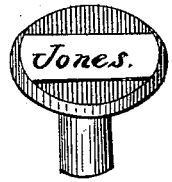 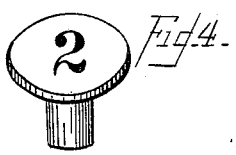 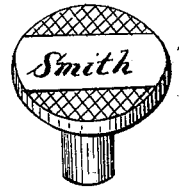
WITNESSES:
L. M. Bartlett
P. Jullien
INVENTOR:
Edward S Van Zile
By W. A. Bartlett
Atty.

UNITED STATES PATENT OFFICE.

EDWARD SIMS VAN ZILE, OF NEW YORK, N. Y., ASSIGNOR TO EDWIN A. GROZIER AND FREDERICK A. DUNEKA, OF SAME PLACE.

BULLETIN-BOARD AND BASE-BALL INDICATOR.

SPECIFICATION forming part of Letters Patent No. 402,700, dated May 7, 1889.

Application filed December 14, 1888. Serial No. 293,605. (No model.)

*To all whom it may concern:*

Be it known that I, EDWARD SIMS VAN ZILE, residing at New York, in the county of New York and State of New York, have invented certain new and useful Improvements in Bulletin-Boards and Base-Ball Indicators, of which the following is a specification, reference being had therein to the accompanying drawings.

This invention relates to display or bulletin boards or tablets, and is intended to show the progress of a base-ball game at some place distant from the playground.

The invention consists in the construction of the board and the arrangements of its parts, whereby the exact condition of the game may be indicated at any time.

The diagram Figure 1 indicates the face of a bulletin-board containing the general features of this invention. Fig. 2 indicates a cross-section on the line $x\ x$. Figs. 3, 4, and 5 are perspective views of marking pins or buttons.

A indicates a bulletin-board of usual construction, having on its surface a diagram representing the diamond field of a base-ball ground. Each base or corner of the diamond has a hole or catch for the reception of a marking pin or button, and the respective positions of the nine not at the bat are indicated on the board near the diamond.

On the board in convenient positions, as at B and C, are two suitable diagrams or tables with figures to indicate the order of batting, blanks for the names of players, and letters indicating the particular part each player takes in the field, as "R.F." for right field, "3B." for third base, and so on. The names of players will be entered in these spaces at the beginning of a game, so that the exact part taken by each player may be known. The face of the board will have spaces, as at D and E, on which the runs and outs may be marked; also a space, as at F, for the score by runnings. Further spaces, as G and H, may be provided with words—such as "Base Hits," "Errors," &c.—and holes in the board opposite the words, where such acts may be marked by inserting pins, as hereinafter described. At the head of the board or in other conspicuous position is a space, as K, in which the names of contesting clubs may be given and such other information as may be desirable. Other spaces, as at M M, may be provided on the board, and all the spaces where further information will accrue in the progress of the game may be provided with holes or catches for the indicating pins or buttons.

A series of marking pins or buttons will be provided for use with the board. These pins will be preferably of different colors, there being at least one set of nine pins for each club. The pins of each set may be labeled with the names of the players, or they may be simply numbered from one to nine, and the names being given in the proper order in the spaces B C the numbered pin will represent the player. Duplicates of these pins may be used for indicating in squares M M.

The board is to be posted in some conspicuous place, as in a pool-room or, as it has been used, in front of a newspaper-office, communication being had by telephone or telegraph with the base-ball ground. At the beginning of the game the board will be lettered to indicate the clubs and players and their positions. Then, as the game progresses, the superintendent of the board will receive reports from the field and mark them on the board by means of the pins, which should be large enough to be visible across the room or street. Thus if the game be between New York and Boston clubs, (New York being designated by red pins and Boston by blue pins,) suppose Smith to be No. 1, Brown 2, Jones 3, and Robinson 4 of the New York club, their names will be entered in that order in square B, and also field position of each designated in the same square. If the New York club be at the bat, red pin No. 1 will be inserted in the hole at home-base as the superintendent receives word that Smith takes his place at bat, or a pin labeled "Smith" may be used instead of a mere number. Smith's progress from base to base will be indicated by moving this pin, and the position of Brown, or No. 2, be marked in the same way as messages are received from the field. The position of the opposing nine in the field is in the same way indicated by the pins bearing the players' numbers, names, initials, or photographs, and as players are put out or other acts performed and dispatches received announcing the fact the pins are moved to show the condition. Thus a glance at the bulletin-board will at any time inform the intelligent observer of the exact progress and present position of the game and the part taken by each player in it.

Of course the information on the board may be varied to suit the rules of the game. Advertisements may be placed on the margin, if desired. The pins may be round or square, or other markers may be used to represent the players, and the colors may agree with the club colors. Minor modifications will suggest themselves. The course of the ball itself may be indicated by means of a white or other colored ball or pin, which may be stuck into the board, or by an adhesive patch or wafer.

I claim—

1. A base-ball indicator consisting of a bulletin-board having a diagram of a base-ball field with the positions of the players marked thereon, and a series of indicating-markers, each bearing a color, number, or other distinguishing mark to denote a player, whereby the progress of a game may be set out as dispatches are received from the field, substantially as described.

2. The combination, with a bulletin-board having names and position of players and diagram of ball-field marked thereon and separate pins denoting players, of an adhesive marker to indicate the course of the ball, substantially as described.

In testimony whereof I affix my signature in presence of two witnesses.

EDWARD SIMS VAN ZILE.

Witnesses:
GEORGE W. PAGE,
HERBERT S. CARPENTER.